(12) United States Patent
Hsu

(10) Patent No.: US 7,161,315 B2
(45) Date of Patent: Jan. 9, 2007

(54) SELF DUST-OFF APPARATUS AND METHOD THEREOF

(75) Inventor: Nien-Hui Hsu, Chunan (TW)

(73) Assignee: Coretronic Corporation (TW)

( * ) Notice: Subject to any disclaimer, the term of this patent is extended or adjusted under 35 U.S.C. 154(b) by 12 days.

(21) Appl. No.: 11/095,582

(22) Filed: Apr. 1, 2005

(65) Prior Publication Data

US 2006/0097675 A1 May 11, 2006

(30) Foreign Application Priority Data

Nov. 9, 2004 (TW) .............................. 93134169 A

(51) Int. Cl.
  *H02P 6/22* (2006.01)
  *G03B 21/16* (2006.01)
(52) U.S. Cl. .................. 318/280; 353/57; 353/58; 353/60; 353/61; 353/85; 353/122
(58) Field of Classification Search .................. 353/57, 353/58, 60, 85, 122
See application file for complete search history.

(56) References Cited

U.S. PATENT DOCUMENTS

| | | | | |
|---|---|---|---|---|
| 4,222,755 A * | 9/1980 | Grotto | .......................... | 55/291 |
| 4,512,392 A * | 4/1985 | van Ee et al. | ................. | 165/54 |
| 4,523,630 A * | 6/1985 | Wiklund | ....................... | 165/54 |
| 4,637,825 A * | 1/1987 | Howeth | ......................... | 55/302 |
| 4,718,140 A * | 1/1988 | Johnson | ......................... | 15/330 |
| 4,778,491 A * | 10/1988 | Yow, Sr. | .......................... | 95/26 |
| 4,836,834 A * | 6/1989 | Steele | ........................... | 95/279 |
| 5,018,944 A * | 5/1991 | Bielecki et al. | .......... | 416/146 R |
| 5,129,922 A * | 7/1992 | Kaiser | .......................... | 95/279 |
| 5,177,985 A * | 1/1993 | Igarashi et al. | ................ | 66/168 |
| 5,226,285 A * | 7/1993 | Dankowski | .................... | 62/184 |
| 5,396,304 A * | 3/1995 | Salerno et al. | ............... | 353/122 |
| 5,469,718 A * | 11/1995 | Gutschmit | ..................... | 66/168 |
| 5,860,719 A * | 1/1999 | Suzuki et al. | .................. | 353/61 |
| 5,956,228 A * | 9/1999 | Zahorsky et al. | ............ | 361/695 |
| 5,967,749 A * | 10/1999 | Eaves et al. | .................... | 416/3 |
| 6,041,612 A * | 3/2000 | Stringer | ........................ | 62/303 |
| 6,152,699 A * | 11/2000 | Shikata et al. | ................. | 417/12 |
| 6,203,159 B1 * | 3/2001 | Takizawa | ...................... | 353/61 |
| 6,318,108 B1 * | 11/2001 | Holstein et al. | ............... | 62/279 |
| 6,350,292 B1 * | 2/2002 | Lee et al. | ................... | 55/459.1 |
| 6,364,492 B1 * | 4/2002 | Fujimori et al. | ............. | 353/119 |
| 6,481,388 B1 * | 11/2002 | Yamamoto | ................ | 123/41.12 |
| 6,521,007 B1 * | 2/2003 | Tanaka et al. | ................. | 55/385.2 |
| 6,532,151 B1 * | 3/2003 | Osecky et al. | ............... | 361/687 |
| 6,561,655 B1 * | 5/2003 | Onishi et al. | .................. | 353/61 |
| 6,562,093 B1 * | 5/2003 | Oh | ............................... | 55/337 |
| 6,637,895 B1 * | 10/2003 | Fujimori et al. | ............. | 353/119 |
| 6,709,115 B1 * | 3/2004 | Chimura et al. | ............. | 353/119 |
| 6,710,762 B1 * | 3/2004 | Hasegawa | .................... | 345/101 |

(Continued)

FOREIGN PATENT DOCUMENTS

JP          10164798 A    *   6/1998

*Primary Examiner*—Lincoln Donovan
*Assistant Examiner*—Robert W. Horn

(57) ABSTRACT

A self dust-off apparatus includes a fan and a controller. The fan, which can be driven to rotate clockwise or counter-clockwise, is installed in a projector. The controller is employed to direct the rotational direction (clockwise or counterclockwise) of the fan. In the normal operation, the fan rotates to guide the air from an inlet to an outlet. In the dust-off operation, the fan rotates along reverse direction to guide air inversely in relation to the normal operation so that dust is taken out of the projector easily.

6 Claims, 5 Drawing Sheets

U.S. PATENT DOCUMENTS

| | | | |
|---|---|---|---|
| 6,733,554 B1 * | 5/2004 | Ribera Salcedo | 55/338 |
| 6,735,081 B1 * | 5/2004 | Bishop et al. | 361/695 |
| 6,749,405 B1 * | 6/2004 | Bassine | 417/313 |
| 6,752,857 B1 * | 6/2004 | Birdwell | 95/270 |
| 6,761,459 B1 * | 7/2004 | Arsenich | 353/122 |
| 6,792,769 B1 * | 9/2004 | Trulaske, Sr. | 62/231 |
| 6,805,446 B1 * | 10/2004 | Arai et al. | 353/61 |
| 6,821,202 B1 * | 11/2004 | Voorhies | 454/184 |
| 6,834,964 B1 * | 12/2004 | Nishihara et al. | 353/52 |
| 6,840,628 B1 * | 1/2005 | Arai et al. | 353/58 |
| 6,868,785 B1 * | 3/2005 | Dohner et al. | 101/423 |
| 6,959,671 B1 * | 11/2005 | Nakagawa et al. | 123/41.49 |
| 6,961,035 B1 * | 11/2005 | Endo et al. | 345/87 |
| 6,976,760 B1 * | 12/2005 | Ito et al. | 353/61 |
| 6,981,770 B1 * | 1/2006 | Murai et al. | 353/61 |
| 2002/0008852 A1 * | 1/2002 | Onishi et al. | 353/57 |
| 2004/0246447 A1 * | 12/2004 | Shiraishi | 353/58 |
| 2006/0097675 A1 * | 5/2006 | Hsu | 318/280 |

* cited by examiner

SELF DUST-OFF APPARATUS AND METHOD THEREOF

RELATED APPLICATIONS

The present application is based on, and claims priority from, Taiwan Application Serial Number 93134169, filed Nov. 9, 2004, the disclosure of which is hereby incorporated by reference herein in its entirety.

BACKGROUND OF THE INVENTION

1. Field of Invention

The invention relates to a projector and, in particular, to a self dust-off apparatus for the projector.

2. Related Art

The cooling structure of a conventional projector 10, as shown in FIG. 1A, has the inlet 11 and the outlet 12 formed on the projector housing 13. A fan 14 is provided between the inlet 11 and the outlet 12 for driving cooling air from the inlet 11 into the housing 13 to cool down the power supply 15. Afterwards, the cooling air is guided to cool down the bulb 16 and finally expelled outside the housing 13 via the outlet 12.

As shown in FIG. 1B, the airflow on the inlet side 141 of the fan 14 is a laminar flow, while that on the outlet side 142 is a turbulent flow with swirls. Since the laminar flow has thicker boundary layers, dust in the air is likely to gradually deposit on the fan 14 and other elements on the inlet side 141 (e.g. the power supply 15). With the accumulation of dust, the efficiency of the fan is lowered and the thermal resistance of the power supply 15 is increased. Therefore, the projector has to be cleaned periodically in order to remove dust on the fan 14 and the power supply 15. Generally speaking, it becomes more difficult to remove dust as the volume of the projector and its internal space get smaller. Besides, one may install a filter (not shown in the drawing) at the inlet 11 to filter the cooling air entering the projector 10. However, this reduces the amount of airflow into the projector. One then has to increase the fan speed to obtain the desired airflow. Nevertheless, this method has the problem of noises.

Therefore, how to effectively remove dust in the projector is an important issue in the field.

SUMMARY OF THE INVENTION

An objective of the invention is to provide a self dust-off apparatus, which can remove dust accumulated inside the projector out of the projector without taking it apart.

To achieve the above objective, the disclosed self dust-off apparatus includes a fan and a controller. The fan, which can be driven to rotate clockwise or counterclockwise, is installed in a projector. The controller is in electrical communication with the fan and is employed to direct the rotational direction (clockwise or counterclockwise) of the fan. In the normal operation, the fan rotates in a first rotational direction to guide the cooling air from an inlet into the projector. As the cooling air flows by the elements, it takes away the heat generated from the elements and exits via an outlet. In the dust-off operation, the controller drives the fan to rotate in a second rotational direction reverse to the first rotational direction to guide air inversely so that dust is taken out of the projector easily.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE PREFERRED EMBODIMENT

The present invention will be apparent from the following detailed description, which proceeds with reference to the accompanying drawings, wherein the same references relate to the same elements.

Figure 1A:
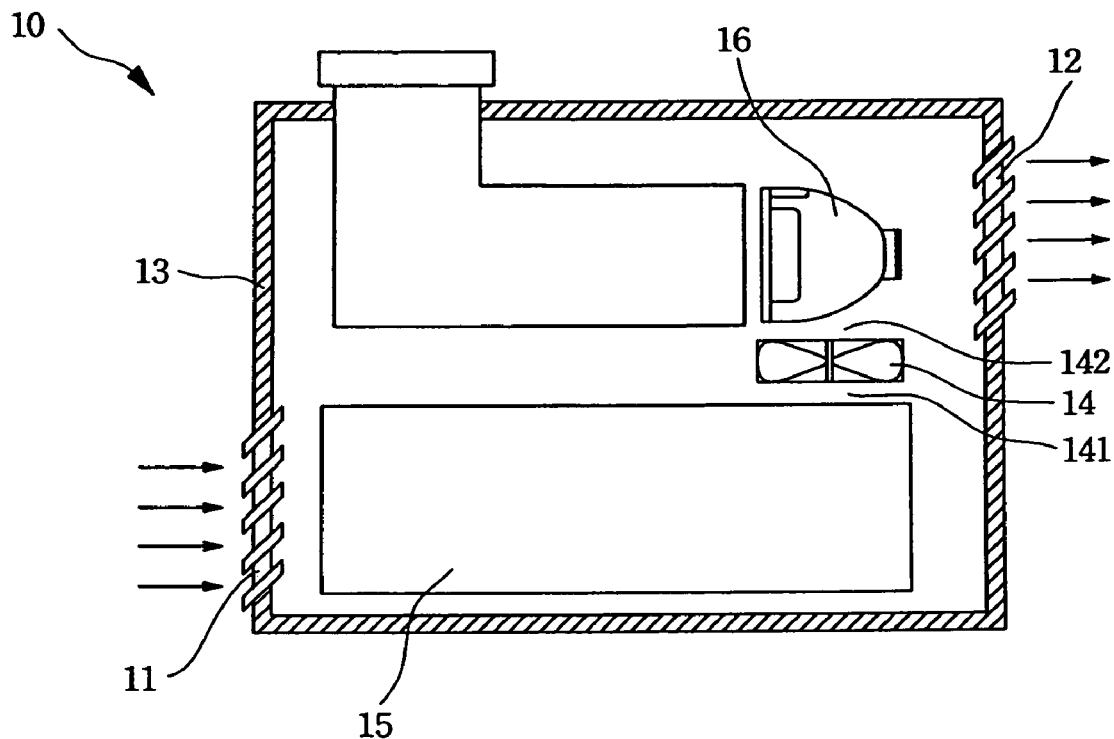
FIG. 1A is a schematic view of the cooling structure of a conventional projector.
Figure 1B:
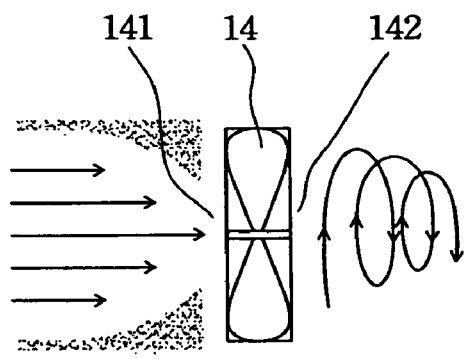
FIG. 1B is a schematic view showing the airflow field on the inlet and outlet sides of the conventional fan.
Figure 2:
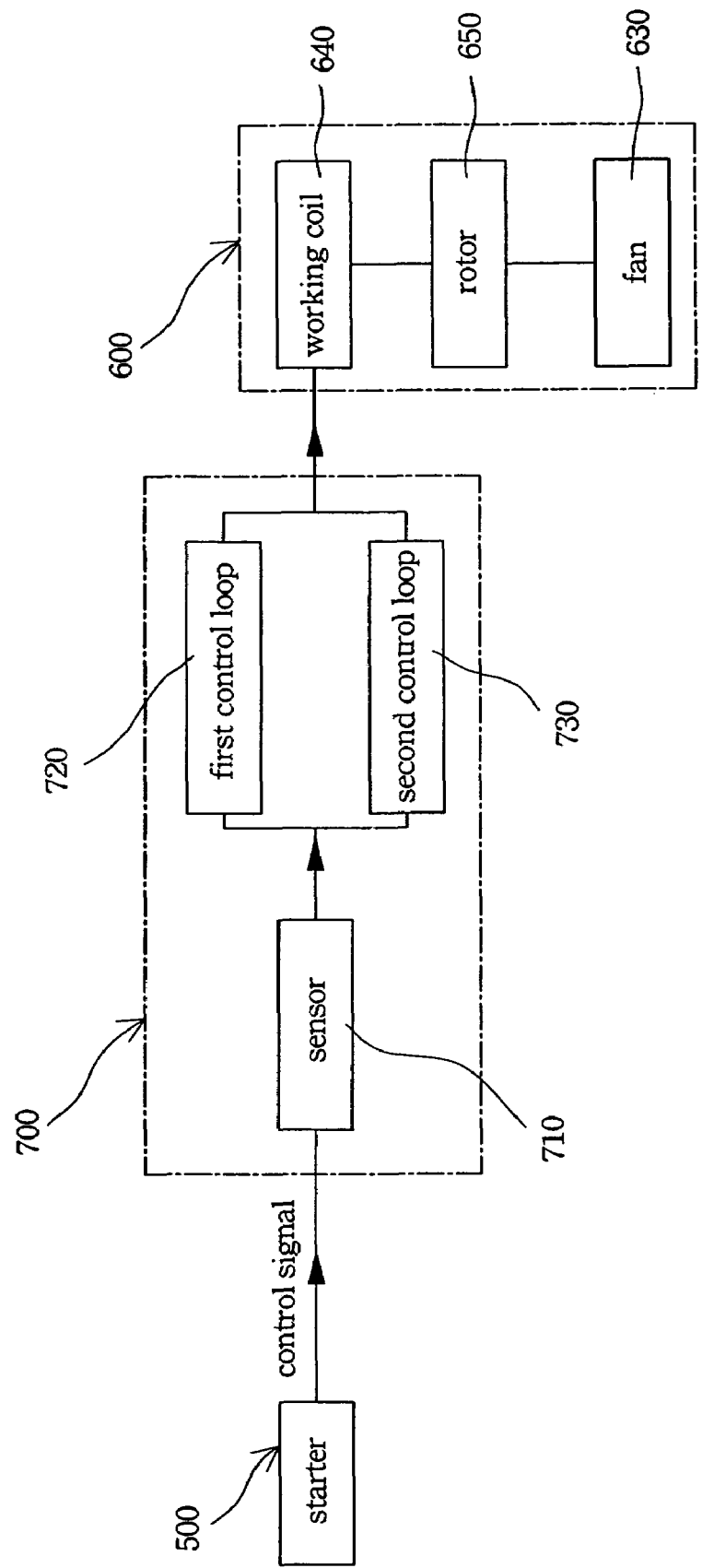
FIG. 2 is a control block diagram of the disclosed self dust-off apparatus.
Figure 4:
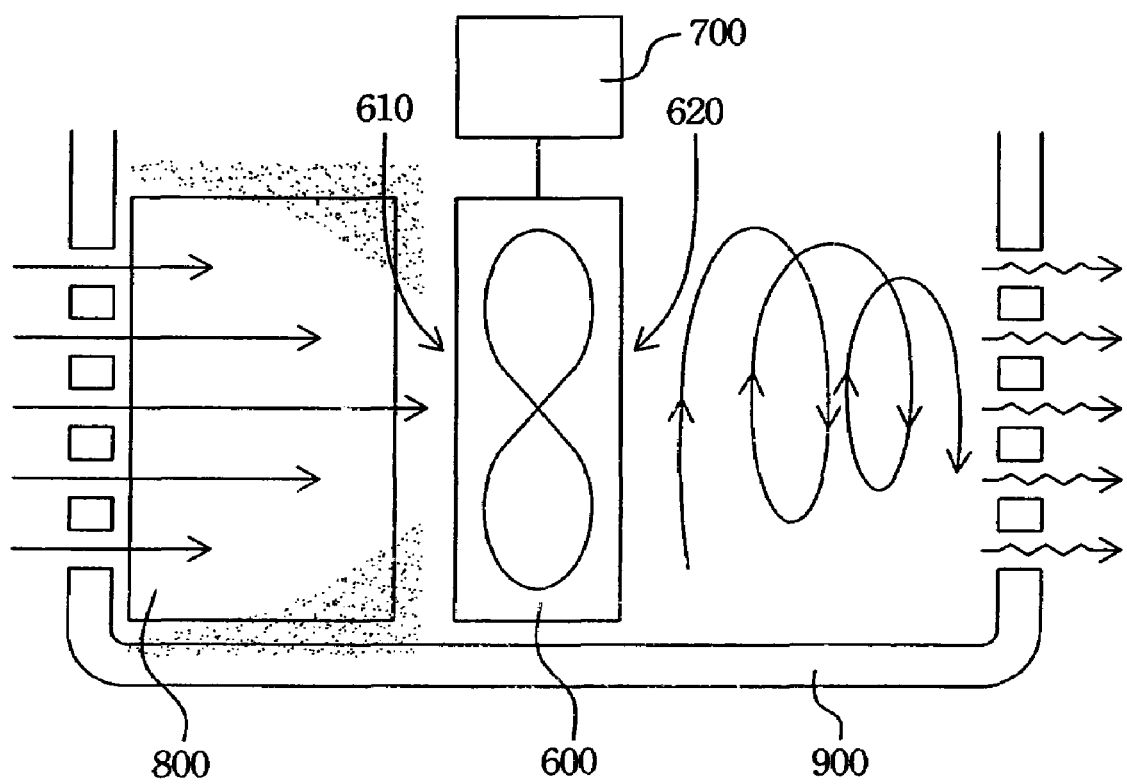
FIG. 4 is a schematic view showing the airflow field on the inlet and outlet sides of the fan when the disclosed self dust-off apparatus is in the image display mode.

As shown in FIGS. 2 and 4, the disclosed self dust-off apparatus includes an axial fan 600, a controller 700, and a starter 500. The axial fan 600 is installed inside a projector 900 and has a normal inlet side 610, a normal outlet side 620, a fan 630 which can rotate in clockwise or counterclockwise direction, a working coil 640, and a rotor 650. The working coil 640 and the rotor drive the fan 630 to rotate in either a first rotational direction or a second rotational direction. The first rotational direction and the second rotational direction have reverse inlet and outlet directions. In this embodiment, the first rotational direction is clockwise and the second rotational direction is counterclockwise. The normal inlet side 610 and the normal outlet side 620 refer to the inlet side and outlet side when the axial fan 600 is cooling the projector. The controller 700 is in electrical communication with the axial fan 600 to drive the axial fan 600 and control the rotational direction of its blades. The controller 700 includes a sensor 710, a first control loop 720 connected to the sensor 710 and a second control loop 730. The starter 500 is connected to the controller 700 to provide a control signal to the sensor 710 of the controller 700. The control signal is generated by triggering an on-screen display (OSD) interface, a button or a remote control.

Figure 3:
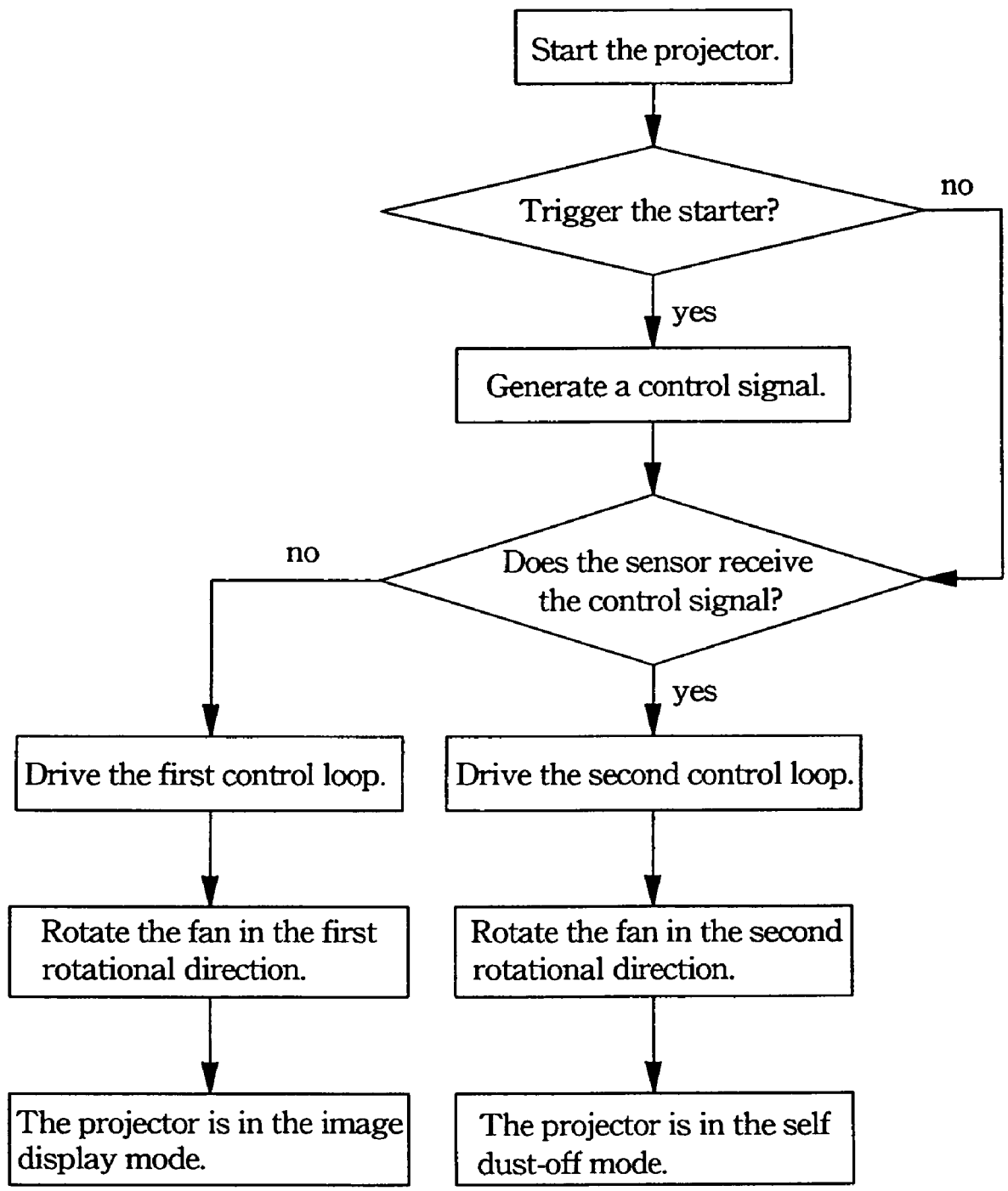
FIG. 3 is a control flowchart of the disclosed self dust-off apparatus.

As shown in FIGS. 3 and 4, when the projector is displaying an image, the projector is started without starting the starter 500. At this moment, the sensor 710 has not received the control signal. Therefore, the first control loop 720 is driven to rotate the blades of the axial fan 600 in the first rotational direction, guiding the cooling air into the projector 900. As the air passes by circuits or optical elements 800, the heat generated by them is brought outside the projector 900.

Along with the cooling air that enters the projector, dust is also sucked into the projector 900. Since the air on the inlet side 610 is a laminar flow and has thick boundary layers, dust gradually deposits inside the projector 900 and on the blades of the fan 600. Therefore, the self dust-off mode has to be executed after a period of use.

Figure 5:
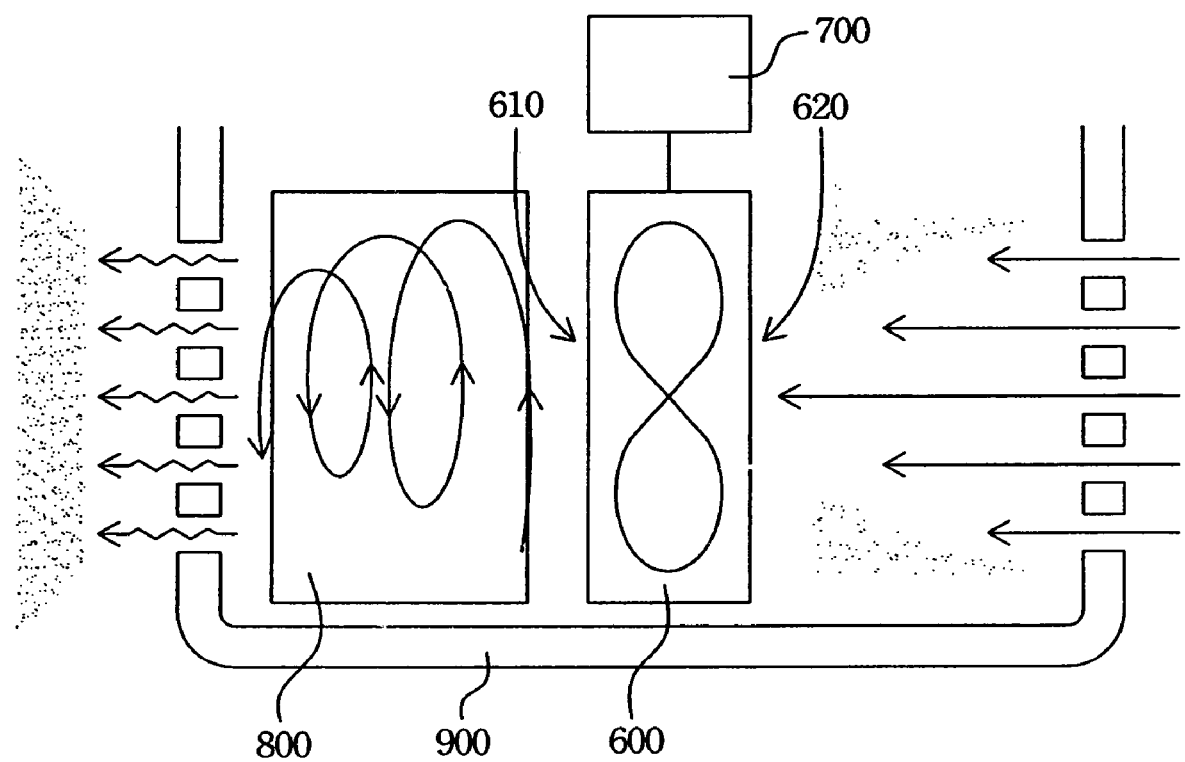
FIG. 5 is a schematic view showing the airflow field on the inlet and outlet sides of the fan when the disclosed self dust-off apparatus is in the self dust-off mode.

To execute the self dust-off mode, one triggers the starter 500 to generate a control signal when the projector is not in use. After the sensor 701 detects the control signal, it drives the second control loop 730 to action. The working coil 640 generates an electromagnetic field, using the rotor 650 drive the blades 630 to rotate in the second rotational direction. The fields of airflow on the normal inlet side 610 and the normal outlet side 620 are changed (FIG. 5) to drag air from the normal outlet side 620 into the projector 900 and then exit from the normal inlet side 610. Since in this case the normal inlet side 610 has a turbulent with thin boundary layers while the normal outlet side 620 has a laminar flow with thick boundary layers, the deposited dust is removed out of the projector 900.

Therefore, the disclosed self dust-off means does not need one to take apart the projector housing in order to clean the deposited dust. Instead, the invention alters the rotational direction of the fan to exchange the inlet and outlet directions, changing the fields of airflow on the normal inlet side and the normal outlet side. The cleaning task is thus not limited by the space.

Moreover, when the blades of the axial fan 600 rotate in the second rotational direction, cooling air enters from the normal outlet side 620 along with some dust. However, since in this case the fan rotates at a low speed in a short time just to clean the dust inside the projector, there is really not a lot of incoming new dust. Once the fan resumes its rotation in the first rotational direction, the dust entering from the normal outlet side 620 is brought outside the projector 900. Consequently, the cleaning method of the invention indeed can effectively remove the dust.

From the above-mentioned preferred embodiment, one sees that the invention has the following advantages:

1. The dust inside the projector is brought outside for maintaining the required cooling effect, preventing such problems as a short circuit and increased thermal resistance due to deposited dust.

2. One does not need to take apart the projector housing. The dust can be removed by simply reversing the rotational direction of the fan.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A self dust-off apparatus for a projector having a lamp module and a power supply, the self dust-off apparatus comprising:
   fan installed inside the projector and including blades rotatable in a first rotational direction or a second rotational direction;
   a controller in electrical communications with the fan to drive the fan; and
   a starter connected to the controller to provide a control signal to the controller;
   wherein the starter provides the control signal to the controller only when the projector is not used for displaying an image, the controller receives the control signal and drives the fan to switch from the first rotational direction to the second rotational direction for removing dust deposited on the lamp module, the power supply and the fan out of the projector.

2. The self dust-off apparatus of claim 1, wherein the first rotational direction and the second rotational direction are clockwise and counterclockwise.

3. The self dust-off apparatus of claim 1, wherein the controller further includes a sensor, a first control loop and a second control loop connected to the sensor, the fan further including a working coil and a rotor, the sensor being used to detect the control signal, the control loops being used to drive the working coil to generate an electromagnetic field according to the control signal, rotating the rotor in either the first rotational direction or the second rotational direction.

4. The self dust-off apparatus of claim 1, wherein the starter includes a button.

5. The self dust-off apparatus of claim 1, wherein the control signal is generated by an on-screen display (OSD) interface, a button or a remote control.

6. A self dust-off method for removing dust deposited in the vicinity of an inlet side of a fan, a lamp module and a power supply of a projector, the method comprising the steps of:
   stopping a normal operation of the projector;
   triggering a starter to generate a control signal only after the normal operation of the projector is stopped; and
   switching a rotational direction of the fan to change an inlet and an outlet directions of the fan after the control signal is generated, thereby removing dust deposited in the vicinity of the inlet side of the fan, the lamp module and the power supply out of the projector.

* * * * *